(12) United States Patent
Mitsunari et al.

(10) Patent No.: US 11,035,741 B2
(45) Date of Patent: Jun. 15, 2021

(54) TEMPERATURE MEASUREMENT SUBSTRATE AND TEMPERATURE MEASUREMENT SYSTEM

(71) Applicant: TOKYO ELECTRON LIMITED, Tokyo (JP)

(72) Inventors: Tadashi Mitsunari, Yamanashi (JP); Satoshi Tanaka, Tokyo (JP); Tsuyoshi Moriya, Yamanashi (JP); Toshiya Matsuda, Tokyo (JP); Masaaki Miyagawa, Miyagi (JP); Kenya Iwasaki, Kumamoto (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 308 days.

(21) Appl. No.: 16/095,114

(22) PCT Filed: Apr. 6, 2017

(86) PCT No.: PCT/JP2017/014374
§ 371 (c)(1),
(2) Date: Oct. 19, 2018

(87) PCT Pub. No.: WO2017/183471
PCT Pub. Date: Oct. 26, 2017

(65) Prior Publication Data
US 2019/0120703 A1    Apr. 25, 2019

(30) Foreign Application Priority Data
Apr. 19, 2016   (JP) .............................. JP2016-083933

(51) Int. Cl.
*G01K 11/32* (2021.01)
*G01K 11/324* (2021.01)

(52) U.S. Cl.
CPC ............ *G01K 11/32* (2013.01); *G01K 11/324* (2021.01)

(58) Field of Classification Search
CPC ........ G01K 13/00; G01K 1/026; G01K 7/427; G01K 2213/00; G01K 11/32;
(Continued)

(56) References Cited

U.S. PATENT DOCUMENTS 5,775,808 A * 7/1998 Pan .................... G01K 11/3213
374/131
6,190,040 B1   2/2001 Renken et al.
(Continued)

FOREIGN PATENT DOCUMENTS

CN         1793806 A      6/2006
CN       107748177 A  *   3/2018
(Continued)

OTHER PUBLICATIONS

International Search Report dated Jun. 20, 2017 in PCT/JP2017/014374.

*Primary Examiner* — Gail Kaplan Verbitsky
(74) *Attorney, Agent, or Firm* — Rothwell, Figg, Ernst & Manbeck, P.C.

(57) ABSTRACT

A temperature measurement substrate according to an embodiment of the present disclosure includes: a substrate which is any one of a semiconductor wafer and a substrate for a flat panel display; and at least one optical fiber laid on a surface of the substrate and having a first pattern portion and a second pattern portion formed more densely than the first pattern portion.

15 Claims, 8 Drawing Sheets

(58) Field of Classification Search
CPC .. G01K 11/125; G01K 11/3213; G01K 11/20; G01K 11/324; G01K 11/00; G01K 11/12; G01K 11/322; G01K 1/20; G01K 5/48; G01N 2030/3076; G01J 5/0821
USPC ............... 374/178, 110, 112, 137, 130, 131; 356/43, 44
See application file for complete search history.

(56) References Cited

U.S. PATENT DOCUMENTS

| | | | | |
|---|---|---|---|---|
| 8,608,378 | B2 * | 12/2013 | Ishida | G01K 1/18 374/183 |
| 8,740,455 | B2 * | 6/2014 | Hall | G01K 11/3206 374/136 |
| 9,645,018 | B2 * | 5/2017 | Lee | G01K 15/005 |
| 2004/0136681 | A1 * | 7/2004 | Drewery | H01S 3/063 385/142 |
| 2005/0081398 | A1 * | 4/2005 | Sun | G01D 11/30 33/645 |
| 2014/0233600 | A1 * | 8/2014 | Lee | G01K 11/32 374/1 |
| 2014/0248720 | A1 * | 9/2014 | Reichel | H01L 21/67248 438/14 |
| 2016/0209922 | A1 * | 7/2016 | Kim | G06F 3/0416 |
| 2019/0064446 | A1 * | 2/2019 | Tezuka | G01D 5/35374 |
| 2020/0108613 | A1 * | 4/2020 | Tsuji | B41J 2/16588 |

FOREIGN PATENT DOCUMENTS

| | | | | |
|---|---|---|---|---|
| JP | 5-346355 | | 12/1993 | |
| JP | 11-344386 | | 12/1999 | |
| JP | 2002169029 | A * | 6/2002 | |
| JP | 2002-544502 | | 12/2002 | |
| JP | 2005-195502 | A | 7/2005 | |
| JP | 2011-529400 | A | 12/2011 | |
| TW | 201006588 | A | 2/2010 | |
| WO | WO-0068979 | A2 * | 11/2000 | ....... H01L 21/67248 |
| WO | 2015/025808 | A1 | 2/2015 | |

* cited by examiner

TEMPERATURE MEASUREMENT SUBSTRATE AND TEMPERATURE MEASUREMENT SYSTEM

CROSS REFERENCE TO RELATED APPLICATION

This application is a 35 U.S.C. 371 National Phase Entry Application from PCT/JP2017/014374, filed Apr. 6, 2017, which claims priority to Japanese Patent Application No. 2016-083933, filed Apr. 19, 2016, the disclosures of which are incorporated herein in their entirety by reference, and priority is claimed to each of the foregoing.

TECHNICAL FIELD

The present disclosure relates to a temperature measurement substrate and a temperature measurement system.

BACKGROUND

In the related art, temperature measurement substrates have been known in which temperature detection units such as a plurality of thermocouples or platinum resistance thermal detectors are provided on a substrate (see, e.g., Patent Documents 1 and 2). In these temperature measurement substrates, the temperature of the substrate is measured by detecting the temperature of the substrate by a plurality of temperature detection units.

In addition, there has been known a configuration that measures the temperature distribution of an object to be measured by placing an optical fiber on the object to be measured, and detecting backscattered light generated by the Raman effect of pulse light incident into the optical fiber (see, e.g., Patent Document 3).

PRIOR ART DOCUMENT

Patent Document

Patent Document 1: Japanese Laid-Open Patent Publication No. 11-344386
Patent Document 2: Japanese National Phase Laid-Open Patent Publication No. 2002-544502
Patent Document 3: Japanese Laid-Open Patent Publication No. 05-346355

SUMMARY OF THE INVENTION

Problem to be Solved

However, in the configurations described in Patent Documents 1 and 2, since the temperature of the substrate is measured by detecting the temperature of the substrate by a plurality of temperature detection units, a continuous temperature distribution cannot be measured, and it is difficult to measure the temperature distribution with high spatial resolution.

Moreover, in the configuration described in Patent Document 3, it is difficult to measure a temperature distribution with high spatial resolution when measuring the temperature distribution of a substrate such as a semiconductor wafer. This is because the pulse length of the pulse light incident into the optical fiber is long compared with the size of the substrate such as the semiconductor wafer.

Thus, in one aspect, an object of the present disclosure is to provide a temperature measurement substrate capable of measuring a temperature distribution with high spatial resolution.

Means to Solve the Problem

In order to achieve the above object, a temperature measurement substrate according to an aspect of the present disclosure includes a substrate which is any one of a semiconductor wafer and a substrate for a flat panel display, and at least one optical fiber laid on a surface of the substrate and having a first pattern portion and a second pattern portion formed more densely than the first pattern portion.

Effect of the Invention

With the temperature measurement substrate disclosed herein, it is possible to measure a temperature distribution with high spatial resolution.

DETAILED DESCRIPTION TO EXECUTE THE INVENTION

Hereinafter, embodiments for executing the present disclosure will be described with reference to drawings. Meanwhile, in the present specification and drawings, the same reference numerals are used to denote substantially the same components, and redundant descriptions will be omitted.

(Temperature Measurement System)
A temperature measurement system of an embodiment will be described. The temperature measurement system of the present embodiment is a system that measures a temperature distribution using an optical fiber laid on the surface of a semiconductor wafer (hereinafter, referred to as a "wafer") as a sensor and using Raman scattered light, which is a kind of backscattered light. The temperature measurement system of the present embodiment is used for a substrate processing apparatus that performs a predetermined processing such as a heat treatment on a substrate such as, for example, a semiconductor wafer. Hereinafter, a system that measures a temperature distribution along an optical fiber using Raman scattered light, which is a kind of backscattered light, is also referred to as a Raman optical time domain reflectometer (ROTDR) system.

Figure 1:
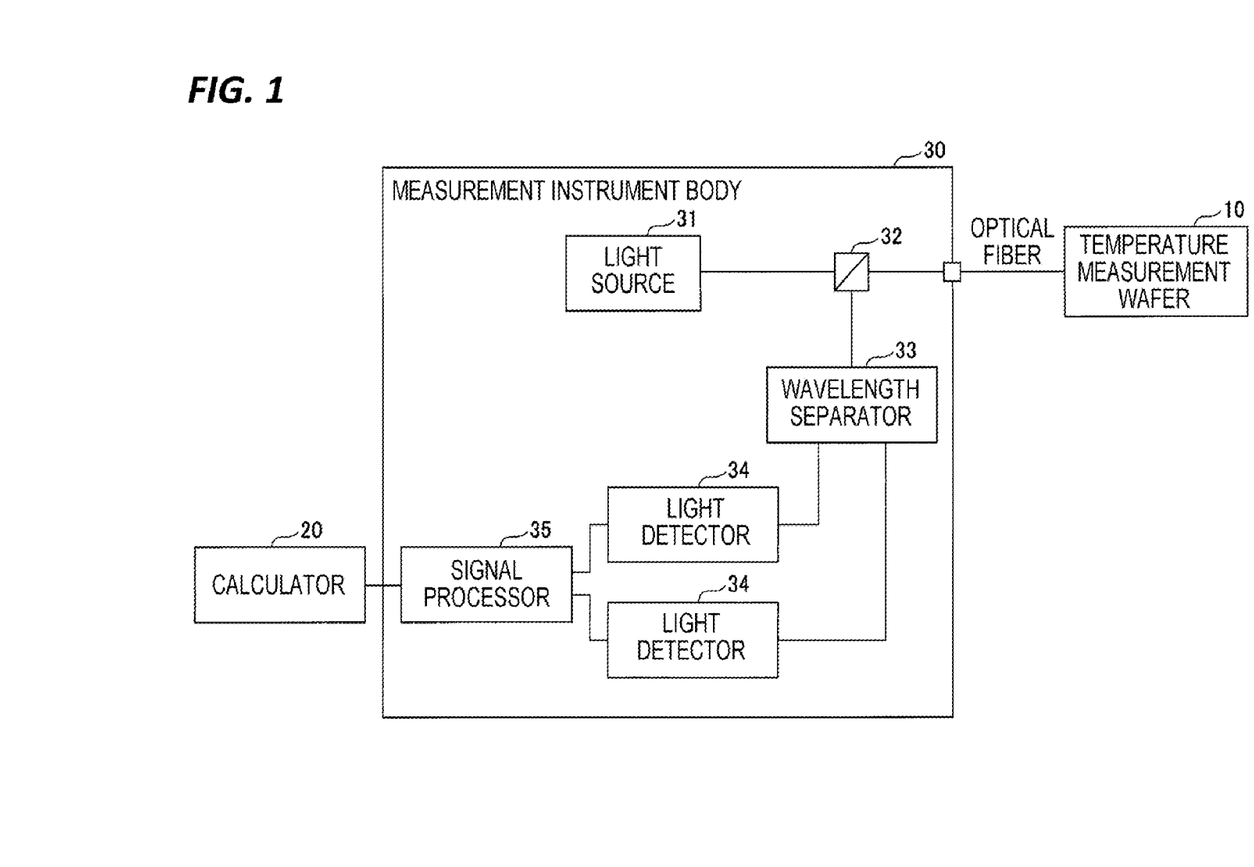
FIG. 1 is a block diagram illustrating an example of a temperature measurement system of an embodiment.

FIG. 1 is a schematic block diagram illustrating an example of a temperature measurement system of an embodiment.

As illustrated in FIG. 1, the temperature measurement system of the present embodiment includes a temperature measurement wafer 10, a calculator 20, and a measurement instrument body 30.

The temperature measurement wafer 10 is a substrate on which an optical fiber is laid on the surface thereof. The details of the temperature measurement wafer 10 will be described later. The calculator 20 is, for example, a computer that controls the measurement instrument body 30.

The measurement instrument body 30 has a light source 31, a beam splitter 32, a wavelength separator 33, a light detector 34, and a signal processor 35, and is used in the state of being connected to an optical fiber.

The light source 31 outputs laser light of a predetermined pulse length (hereinafter, also referred to as "pulse light") at a predetermined cycle. The laser light is incident into the optical fiber from a light source 31 side end (incident end) of the optical fiber via the beam splitter 32. The light incident into the optical fiber proceeds while being scattered by the molecules of the optical fiber. A part of the scattered light generated in the optical fiber returns to the incident end as backscattered light.

Raman scattered light (Stokes light and anti-Stokes light), which is a kind of backscattered light, has temperature dependency. The temperature dependency is greater in anti-Stokes light than in Stokes light. Stoke light is scattered light that is shifted to longer wavelength side than incident light, and anti-stoked light is scattered light shifted to shorter wavelength side than incident light.

The backscattered light passes through the optical fiber, exits from the incident end of the optical fiber, is reflected by the beam splitter 32, and enters the wavelength separator 33.

The wavelength separator 33 includes, for example, a beam splitter, an optical filter, and a condenser lens, separates Raman scattered light into Stocks light and anti-Stocks light, and inputs the separated light into the light detector 34. The light detector 34 outputs an electric signal corresponding to the intensity of the Stocks light and the anti-Stocks light. The signal processor 35 calculates a temperature distribution in the longitudinal direction of the optical fiber based on the electrical signal output from the light detector 34.

Thus, in the temperature measurement system of the present embodiment, the temperature distribution of the wafer is calculated by detecting the temperature dependence of the scattered light, which is a kind of backscattered light, using the optical fiber laid on the surface of the wafer as a sensor. In addition, the position where the Raman backscattered light is generated is calculated by measuring the round trip time until the Raman backscattered light generated in the optical fiber returns to the incident end after the pulse light is incident into the optical fiber.

(Temperature Measurement Wafer)

The temperature measurement wafer 10 of the present embodiment will be described. The temperature measurement wafer 10 according to the present embodiment is used when the temperature distribution of the wafer is calculated by introducing a pulse light into the optical fiber laid on the surface of a wafer. Hereinafter, the temperature measurement wafers of first to fourth embodiments capable of measuring the temperature distribution of a wafer will be described.

First Embodiment

Figure 2:
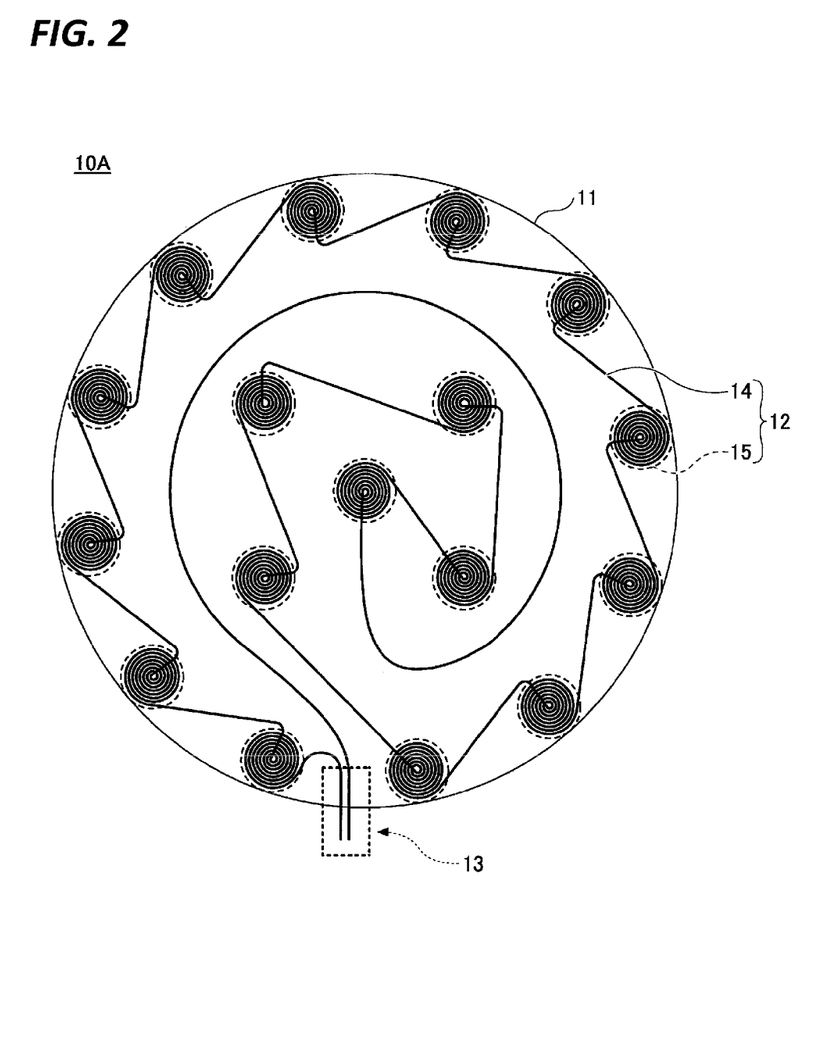
FIG. 2 is a view for explaining an example of a temperature measurement wafer according to a first embodiment.

FIG. 2 is a view for explaining an example of a temperature measurement wafer according to a first embodiment.

As illustrated in FIG. 2, a temperature measurement wafer 10A of the first embodiment includes a wafer 11 and an optical fiber 12.

For example, a silicon (Si) wafer may be used as the wafer 11. The diameter of the wafers 11 is not particularly limited, but may be set to, for example, 300 mm or 450 mm.

The optical fiber 12 is laid on the surface of the wafer 11. The optical fiber 12 is a thin fiber-type tube formed of, for example, quartz glass or plastic. A pulse light output from the light source 31 illustrated in FIG. 1 is incident into the optical fiber 12. The optical fiber 12 has a start end and a tail end on the outer peripheral portion of the wafer 11. The start and tail ends function as connection portions 13 connected to the measurement instrument body 30 illustrated in FIG. 1. Meanwhile, the start and tail ends may be disposed in the center of the wafer 11 as long as light is able to be incident thereon.

The optical fiber 12 has a coarsely formed portion (hereinafter, referred to as a "coarse portion 14") and a portion formed more densely than the coarse portion 14 (hereinafter, referred to as a "dense portion 15") between the start end and the tail end. Coarse portions 14 and dense portions 15 are alternately disposed in the optical fiber 12. The number of coarse portions 14 and the number of dense portions 15 are not particularly limited, but may be determined depending on the size of the wafer 11 or the like. When the optical fiber 12 has a plurality of dense portions 15, the respective dense portions 15 may have the same shape or different shapes. FIG. 2 illustrates an example in which 18 coarse portions 14 and 17 dense portions 15 are alternately arranged over the entire surface of the wafer 11.

Figure 3A:
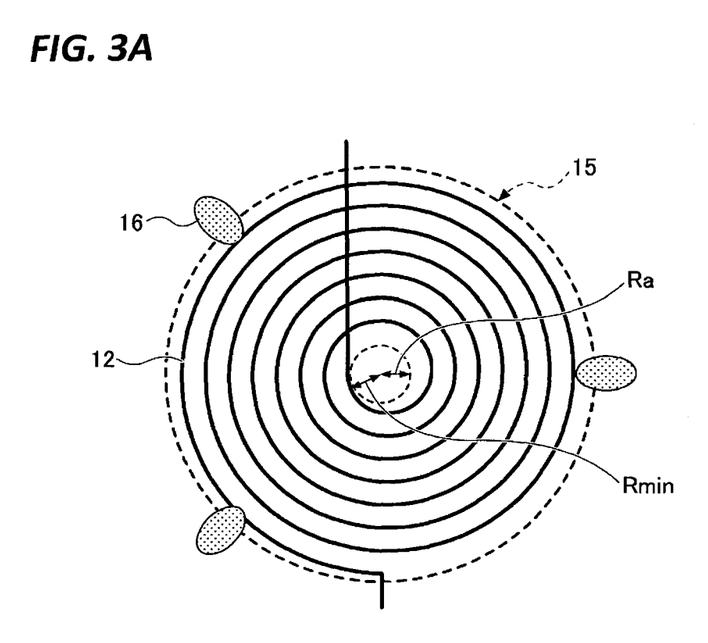
FIG. 3A is a view illustrating an example of a dense portion of the temperature measurement wafer illustrated in FIG. 2.
Figure 3B:
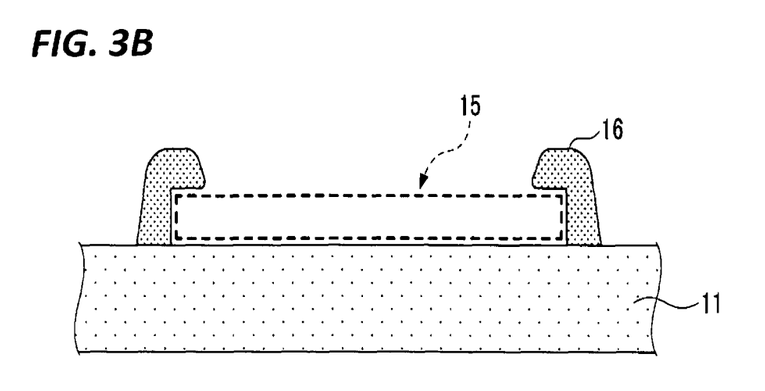
FIG. 3B is a view illustrating an example of the dense portion of the temperature measurement wafer illustrated in FIG. 2.

FIGS. 3A and 3B are views illustrating an example of a dense portion of the temperature measurement wafer illustrated in FIG. 2. FIG. 3A is a schematic plan view of the dense portion, and FIG. 3B is a schematic cross-sectional view of the dense portion. In FIGS. 3A and 3B, one of the plurality of dense portions in the temperature measurement wafer of FIG. 2 is illustrated.

As illustrated in FIG. 3A, the dense portion 15 is formed in a vortex shape with the center of the dense portion 15 as the center of the vortex in plan view. Although the number of turns of the dense portion 15 is not particularly limited, the number of turns may be determined depending on the pulse length of the pulse light incident into the optical fiber 12. This is because in the temperature measurement by the ROTDR system, the spatial resolution in the longitudinal direction of the optical fiber 12 depends on the pulse length, in the core of the optical fiber 12, of the laser light used for measurement. Specifically, the number of turns preferably corresponds to a length equal to or longer than the pulse length of the pulse light incident into the optical fiber 12. This makes it possible to measure the temperature distribution with particularly high spatial resolution. The number of turns of the dense portion 15 preferably corresponds to a length equal to or shorter than twice the pulse length of the pulse light incident into the optical fiber 12, and more preferably corresponds to a length equal to or shorter than 1.5 times the pulse length of the pulse light incident into the optical fiber 12. As a result, it is possible to form as many dense portions 15 as possible on the surface of the wafer 11, so that the number of measurement points on the surface of the wafer 11 can be increased, and the spatial resolution is improved.

Meanwhile, the pulse length L (m) has a value calculated by Equation (1) as follows.

$$L=c\times t/(2\times n_\lambda) \quad (1)$$

Here, t (s) is the pulse width of the laser, c (m/s) is the speed of light, λ (nm) is the laser wavelength at the core, and $n_\lambda$ is the refractive index at the laser wavelength λ (nm). Meanwhile, when a general ROTDR system is used, the pulse length L (m) is about 1 to 2 m.

Further, in the dense portion 15, the bending radius at the portion where the bending radius of the optical fiber 12 is the smallest (hereinafter, referred to as the "minimum bending radius") is preferably not less than the allowable bending radius of the optical fiber 12, and more preferably equal to the allowable bending radius. This makes it possible to densely lay the optical fiber 12 without damaging the optical fiber 12. Therefore, it is possible to reduce the area required for forming the same number of turns. As a result, it is possible to measure the temperature of a smaller region of the surface of the wafer 11. Furthermore, it is possible to form more dense portions 15 on the surface of the wafer 11, and the spatial resolution in measuring the temperature distribution is improved. In FIG. 3A, the minimum bending radius is denoted by Rmin, and the allowable bending radius is denoted by Ra.

As illustrated in FIGS. 3A and 3B, the dense portion 15 is fixed to the surface of the wafer 11 by adhesive members 16 provided at three positions on the outer peripheral portion of the dense portion 15. Thus, the dense portion 15 is capable of maintaining the state of being in contact with the surface of the wafer 11. Due to this, even in vacuum, it is possible to measure the temperature distribution of the wafer 11 in the same manner as in the atmosphere. The type of the adhesive members 16 is not particularly limited as long as the adhesive members 16 are capable of fixing the dense portion 15 on the surface of the wafer 11.

Figure 4A:
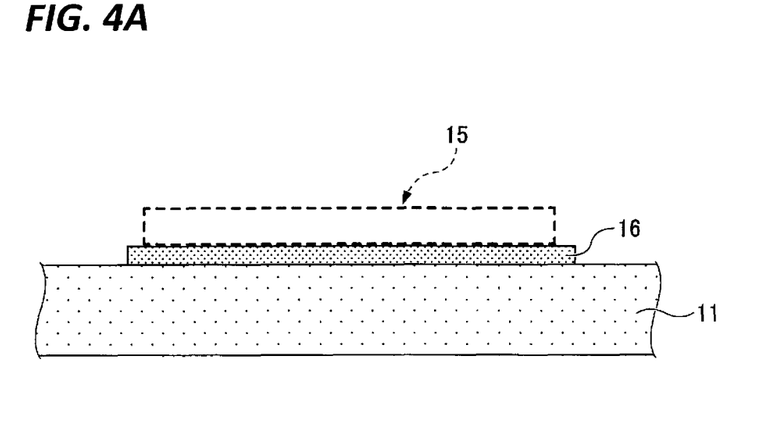
FIG. 4A is a view illustrating another example of the dense portion of the temperature measurement wafer illustrated in FIG. 2.
Figure 4B:
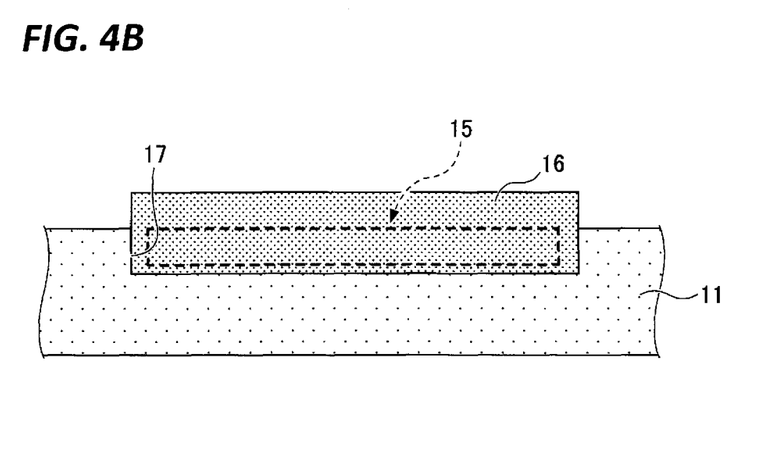
FIG. 4B is a view illustrating another example of the dense portion of the temperature measurement wafer illustrated in FIG. 2.

FIGS. 4A and 4B are views each illustrating another example of a dense portion on the temperature measurement wafer of FIG. 2, in which a cross-section view of the dense portion on the temperature measuring wafer is illustrated.

As illustrated in FIG. 4A, the dense portion 15 may be fixed to the wafer 11 by an adhesive member 16 provided between the wafer 11 and the dense portion 15. In this case, the adhesive member 16 may be made of a highly heat-conductive material, for example, a heat-conductive adhesive or a heat-conductive sheet. As a result, the heat of the wafer 11 can be efficiently transferred to the dense portion 15. Due to this, even in vacuum, it is possible to measure the temperature distribution of the wafer 11 in the same manner as in the atmosphere.

Further, as illustrated in FIG. 4B, the dense portion 15 may be disposed in a recess 17 formed on the surface of the wafer 11 and covered with an adhesive member 16. As a result, since the dense portion 15 is protected by the adhesive member 16, reliability is improved. In this case, the adhesive member 16 may be made of a highly heat-conductive material, for example, a heat-conductive adhesive or a heat-conductive sheet. As a result, the heat of the wafer 11 can be efficiently transferred to the dense portion 15. Due to this, even in vacuum, it is possible to measure the temperature distribution of the wafer 11 in the same manner as in the atmosphere.

Figure 5:
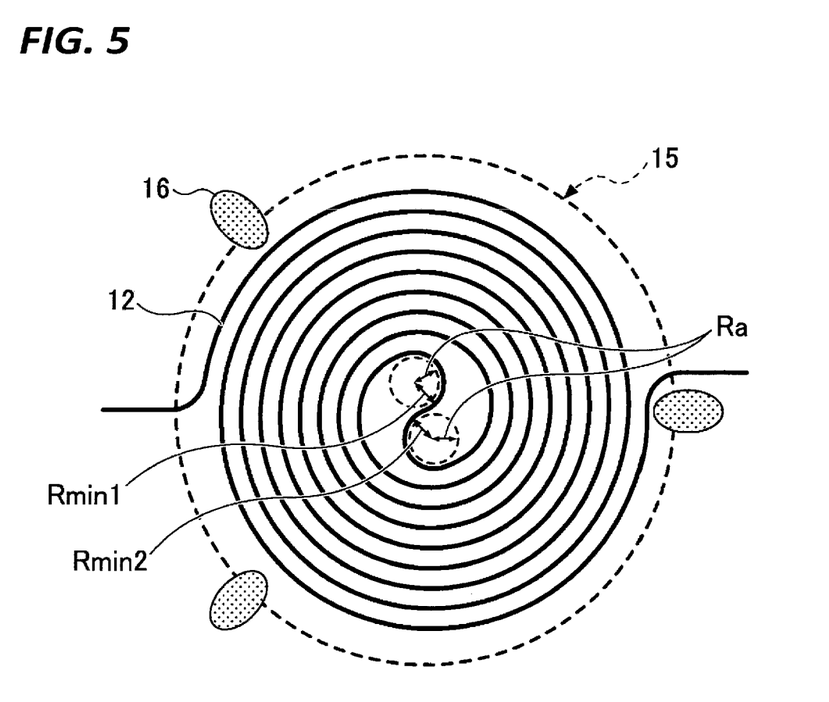
FIG. 5 is a view illustrating still another example of the dense portion of the temperature measurement wafer illustrated in FIG. 2.

FIG. 5 is a view illustrating still another example of a dense portion on the temperature measurement wafer of FIG. 2, in which the top plan view of the dense portion on the temperature measuring wafer is illustrated.

As illustrated in FIG. 5, the dense portion 15 has two centers in plan view, and is formed in a vortex shape such that the midpoint of the entire length of the optical fiber 12 laid in the region of the dense portion 15 is located at the center of the dense portion 15. Although the number of turns of the dense portion 15 is not particularly limited, the number of turns preferably corresponds to a length equal to or longer than the pulse length of the pulse light incident into the optical fiber 12. This makes it possible to measure the temperature distribution with particularly high spatial resolution. The number of turns of the dense portion 15 preferably corresponds to a length equal to or shorter than twice the pulse length of the pulse light incident into the optical fiber 12, and more preferably corresponds to a length equal to or shorter than 1.5 times the pulse length of the pulse light incident into the optical fiber 12. As a result, since it is possible to form as many dense portions 15 as possible on the surface of the wafer 11, the spatial resolution is improved.

Further, in the dense portion 15, the minimum bending radius of the optical fiber 12 is preferably not less than the allowable bending radius of the optical fiber 12, and more preferably equal to the allowable bending radius. This makes it possible to densely lay the optical fiber 12 without damaging the optical fiber 12. Therefore, it is possible to reduce the area required for forming the same number of turns. As a result, it is possible to measure the temperature of a smaller region of the surface of the wafer 11. Furthermore, it is possible to form more dense portions 15 on the surface of the wafer 11, and the spatial resolution in measuring the temperature distribution is improved. In FIG. 5, the minimum bending radii are denoted by Rmin1 and Rmin2, and the allowable bending radius is denoted by Ra.

As described above, in the temperature measurement wafer 10A of the first embodiment, an optical fiber 12 having coarse portions 14 and dense portions 15 formed more densely than the coarse portions 14 is laid on the surface of the wafer 11. Thus, even in the case of measuring the temperature distribution of the diameter of a wafer 11, which is smaller than the pulse length of the pulse light incident into the optical fiber 12, it is possible to acquire the temperature in at least the regions of the dense portions 15, and it is possible to measure the in-plane temperature distribution of the wafer 11 with high spatial resolution.

In addition, in the temperature measurement wafer 10A of the first embodiment, only the optical fiber 12 and the adhesive member 16 are provided on the surface of the wafer 11. Therefore, it is possible to reduce the cost for manufacturing the temperature measurement wafer 10A. In addition, since the temperature measurement wafer 10A does not include electrical elements, it is possible to measure the temperature distribution without being affected by electromagnetic noise caused by plasma even in an environment of a substrate processing apparatus where, for example, plasma is generated.

Particularly, in the temperature measuring wafer 10A of the first embodiment, since the plurality of dense portions 15 and the coarse portions 14 are alternately arranged over the entire surface of the wafer 11, it is possible to finely measure an in-plane temperature distribution with high spatial resolution in the entire surface of the wafer 11. As another effect, since the plurality of dense portions 15 and the coarse portions 14 are alternately disposed over the entire surface of the wafer 11, it is easy to visually recognize a dense portion 15, it is easy to perform the identification of a temperature measurement position, and it is possible to measure the temperature at a desired position on the wafer 11.

Second Embodiment

Figure 6:
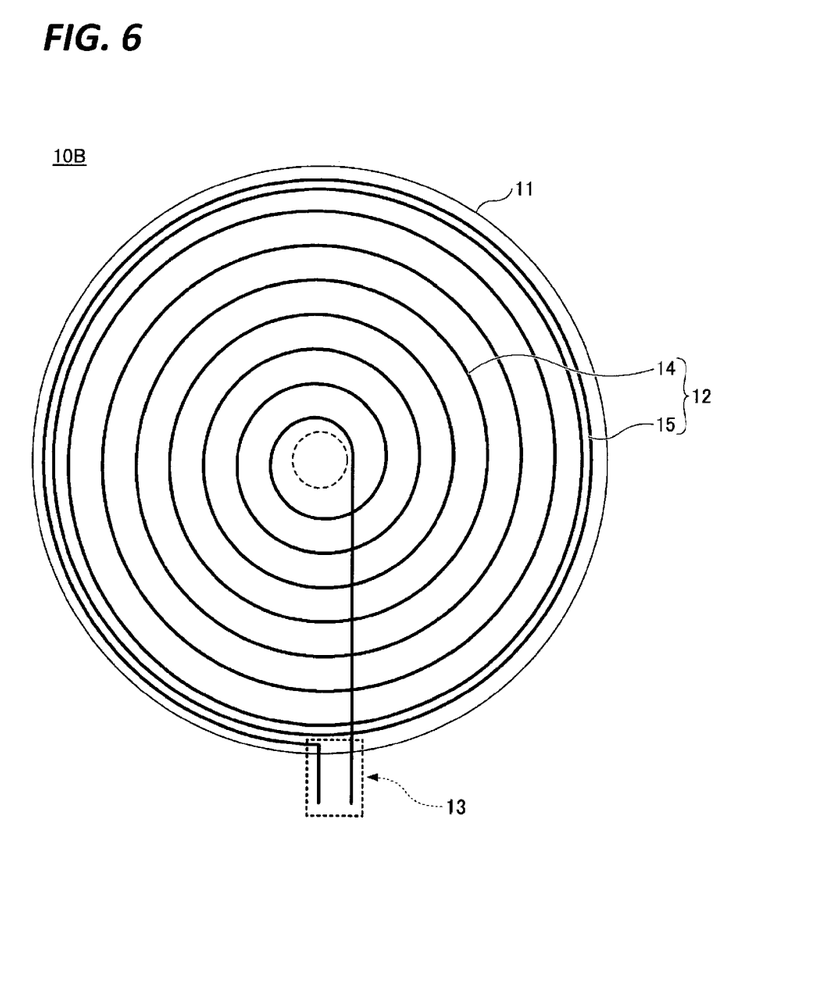
FIG. 6 is a view for explaining an example of a temperature measurement wafer according to a second embodiment.

FIG. 6 is a view for explaining an example of a temperature measurement wafer according to a second embodiment.

As illustrated in FIG. 6, a temperature measurement wafer 10B of the second embodiment includes a wafer 11 and an optical fiber 12.

For example, a silicon (Si) wafer may be used as the wafer 11. The diameter of the wafers 11 is not particularly limited, but may be set to, for example, 300 mm or 450 mm.

The optical fiber 12 is laid on the surface of the wafer 11. The optical fiber 12 is a thin fiber-type tube formed of, for example, quartz glass or plastic. A pulse light output from the light source 31 illustrated in FIG. 1 is incident into the optical fiber 12. The optical fiber 12 has a start end and a tail end on the outer peripheral portion of the wafer 11. The start and tail ends function as connection portions 13 connected to the measurement instrument body 30 illustrated in FIG. 1. Meanwhile, the start and tail ends may be disposed in the center of the wafer 11 as long as light is able to be incident thereon.

Between the start end and the tail end, the optical fiber 12 has a dense portion 15 disposed on the outer peripheral portion of the wafer 11 and a coarse portion 14 disposed closer to the center of the wafer 11 than the dense portion 15 and formed more coarsely than the dense portion 15. Although the number of turns of the dense portion 15 is not particularly limited, the number of turns preferably corresponds to a length equal to or longer than the pulse length of the pulse light incident into the optical fiber 12. This makes it possible to measure the temperature distribution with particularly high spatial resolution. The number of turns of the dense portion 15 preferably corresponds to a length equal to or shorter than twice the pulse length of the pulse light incident into the optical fiber 12, and more preferably corresponds to a length equal to or shorter than 1.5 times the pulse length of the pulse light incident into the optical fiber 12. As a result, since it is possible to form as many dense portions 15 as possible on the surface of the wafer 11, the spatial resolution is improved.

Although FIG. 6 illustrates an example in which one coarse portion 14 and one dense portion 15 are disposed, dense portions 15 and coarse portions 14 may be alternately disposed from the outer peripheral portion of the wafer 11 toward the center. Since the dense portions 15 and the sparse portions 14 are alternately disposed from the outer peripheral portion of the wafer 11 toward the center, the spatial resolution in the radial direction of the wafer 11 can be particularly improved. Further, when the dense portions 15 and the coarse portions 14 are alternately disposed from the outer peripheral portion of the wafer 11 toward the center, it is easy to visually recognize a dense portion 15, it is easy to identify a temperature measurement position, and it is possible to measure the temperature at a desired position in the radial direction of the wafer.

As described above, in the temperature measurement wafer 10B of the second embodiment, as in the first embodiment, an optical fiber 12 having coarse portions 14 and dense portions 15 arranged more densely than the coarse portions 14 is laid on the surface of the wafer 11. Thus, even in the case of measuring the temperature distribution of the diameter of a wafer 11, which is smaller than the pulse length of the pulse light incident into the optical fiber 12, it is possible to acquire the temperature at least in the region of the dense portions 15, and it is possible to measure the in-plane temperature distribution of the wafer 11 with high spatial resolution.

In addition, in the temperature measurement wafer 10B of the first embodiment, as in the second embodiment, only the optical fiber 12 and the adhesive member 16 are provided on the surface of the wafer 11. Therefore, it is possible to reduce the cost for manufacturing the temperature measurement wafer 10B. In addition, since the temperature measurement wafer 10A does not include electrical elements, it is possible to measure the temperature distribution without being affected by electromagnetic noise caused by plasma even in an environment of a substrate processing apparatus where, for example, plasma is generated.

In particular, in the second embodiment, since the dense portions 15 are arranged on the outer peripheral portion of the wafer 11 and the coarse portions 14 are arranged closer to the center side of the wafer 11 than the dense portions 15, it is possible to improve the spatial resolution of the outer peripheral portion and to improve the spatial resolution in the radial direction of the wafer 11.

Third Embodiment

Figure 7:
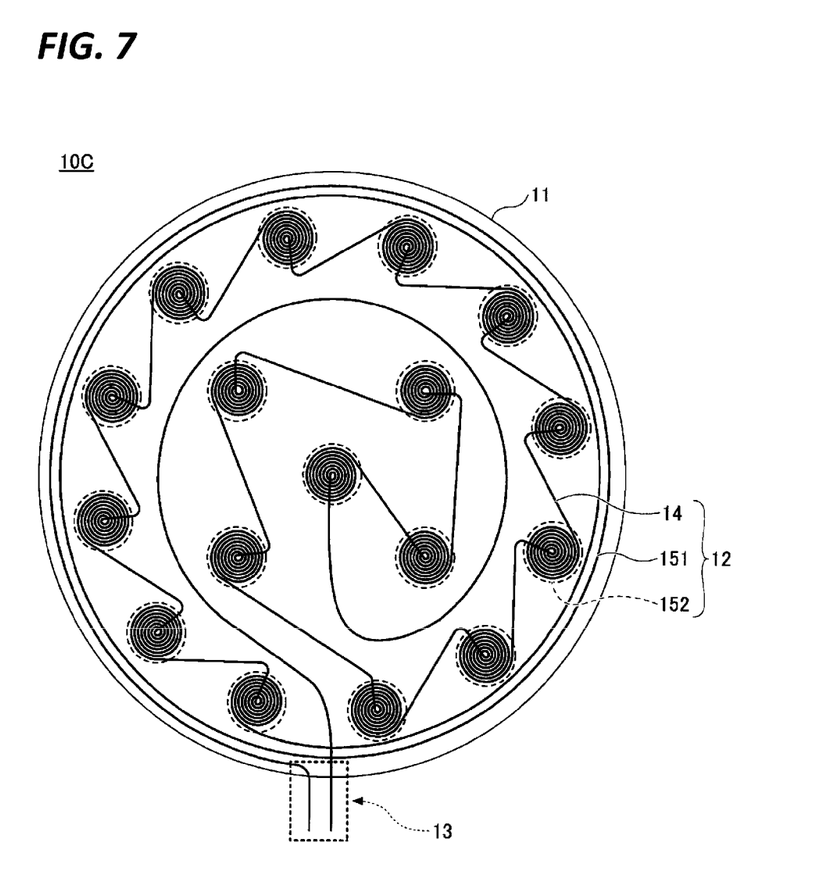
FIG. 7 is a view for explaining an example of a temperature measurement wafer according to a third embodiment.

FIG. 7 is a view for explaining an example of a temperature measurement wafer according to a third embodiment.

As illustrated in FIG. 7, a temperature measurement wafer 10C of the third embodiment includes a wafer 11 and an optical fiber 12.

For example, a silicon (Si) wafer may be used as the wafer 11. The diameter of the wafers 11 is not particularly limited, but may be set to, for example, 300 mm or 450 mm.

The optical fiber 12 is laid on the surface of the wafer 11. The optical fiber 12 is a thin fiber-type tube formed of, for example, quartz glass or plastic. A pulse light output from the light source 31 illustrated in FIG. 1 is incident into the optical fiber 12. The optical fiber 12 has a start end and a tail end on the outer peripheral portion of the wafer 11. The start and tail ends function as connection portions 13 connected to the measurement instrument body 30 illustrated in FIG. 1. Meanwhile, the start and tail ends may be disposed in the center of the wafer 11 as long as light is able to be incident thereon.

Between the start end and the tail end, the optical fiber 12 has a first dense portion 151 disposed on the outer peripheral portion of the wafer 11, and a second dense portion 152 and coarse portions 14 disposed closer to the center side of the wafer 11 than the first dense portion 15. The first dense portion 151 may have the same configuration as the dense portion 15 of the second embodiment, and the coarse portion 14 and the second dense portion 152 may have the same configurations as the coarse portion 14 and the second dense portion 15 of the first embodiment.

As described above, in the temperature measurement wafer 10C of the third embodiment, an optical fiber 12 including, as in the first embodiment, coarse portions 14 and second dense portions 152 arranged more densely than the coarse portions 14, and including, as in the second embodiment, first dense portions 151 disposed on the outer peripheral portion of the wafer 11, is laid on the surface of the wafer 11. Thus, even in the case of measuring the temperature distribution of the diameter of a wafer 11, which is smaller than the pulse length of the pulse light incident into the optical fiber 12, it is possible to acquire the temperature at least in the region of the first dense portions 151 and the second dense portions 152, and it is possible to measure the in-plane temperature distribution of the wafer 11 with high spatial resolution.

In addition, in the temperature measurement wafer 10C of the third embodiment, only the optical fiber 12 and the adhesive member 16 are provided on the surface of the wafer 11. Therefore, it is possible to reduce the cost for manufacturing the temperature measurement wafer 10C. In addition, since the temperature measurement wafer 10A does not include electrical elements, it is possible to measure the temperature distribution without being affected by electromagnetic noise caused by plasma even in an environment of a substrate processing apparatus where, for example, plasma is generated.

Particularly, in the temperature measuring wafer 10C of the third embodiment, as in the first embodiment, since a plurality of dense portions 152 and coarse portions 14 are alternately arranged on the surface of the wafer 11, it is possible to finely measure an in-plane temperature distribution with high spatial resolution in the entire surface of the wafer 11.

In addition, in the temperature measurement wafer 10C of the third embodiment, as in the second embodiment, since the first dense portions 151 are arranged on the outer peripheral portion of the wafer 11 and the coarse portions 14 are arranged closer to the center side of the wafer 11 than the first dense portions 151, it is possible to improve the spatial resolution of the outer peripheral portion and to improve the spatial resolution in the radial direction of the wafer 11. As described above, in the third embodiment, it is possible to finely measure the in-plane temperature distribution with high spatial resolution over the entire surface of the wafer 11 by the single temperature measurement wafer 10C, and it is possible to improve the spatial resolution on the outer peripheral portion and in the radial direction. Therefore, it is not necessary to measure the temperature distribution of the wafer 11 using a plurality of temperature measurement wafers, and it is possible to reduce the time for measuring the temperature distribution of the wafer 11.

Fourth Embodiment

Figure 8A:
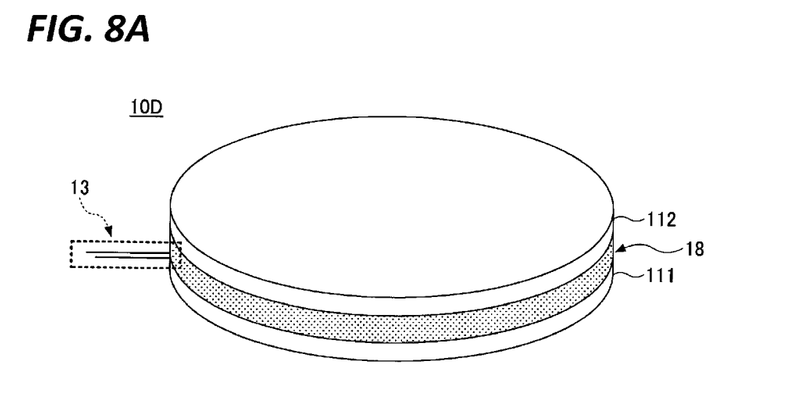
FIG. 8A is a view for explaining an example of a temperature measurement wafer according to a fourth embodiment.
Figure 8B:
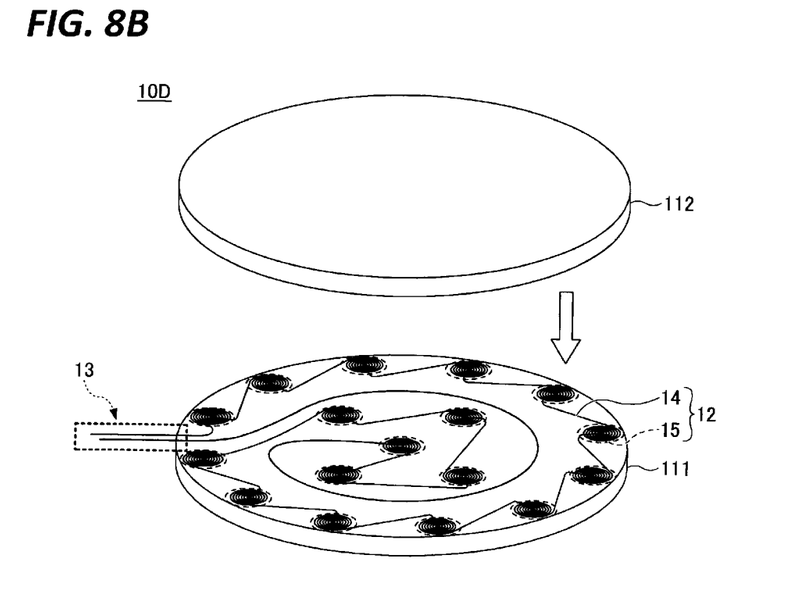
FIG. 8B is a view for explaining an example of the temperature measurement wafer according to the fourth embodiment.

FIGS. 8A and 8B are views for explaining an example of a temperature measurement wafer according to the fourth embodiment. FIG. 8A is a schematic perspective view of a temperature measurement wafer, and FIG. 8B is an exploded perspective view of the temperature measurement wafer of FIG. 8A.

As illustrated in FIG. 8A, the temperature measurement wafer 10D of the fourth embodiment includes a first wafer 111, a second wafer 112, and an optical fiber laying portion 18. As illustrated in FIG. 8B, the optical fiber laying portion 18 is formed by bonding the second wafer 112 to the surface of the first wafer 111 on which the optical fiber 12 is laid, using an adhesive member (not illustrated). That is, the optical fiber 12 is sandwiched between the first wafer 111 and the second wafer 112, and a gap between the first wafer 111 and the second wafer 112 is filled with an adhesive member.

As in the first embodiment, the optical fiber 12 has coarse portions 14 and dense portions 15 formed more densely than the coarse portions 14 between the start end and the tail end, and the coarse portions 14 and the dense portion 15 are alternately arranged. Meanwhile, the optical fiber 12 may be arranged in the same manner as in the second embodiment or the third embodiment.

In the temperature measurement wafer 10D of the fourth embodiment, since the optical fiber 12 is sandwiched between the first wafer 111 and the second wafer 112 and the gap between the first wafer 111 and the second wafer 112 is filled with an adhesive member, the optical fiber 12 is not exposed. Therefore, the optical fiber 12 is not directly exposed to a process environment, and deterioration of the surface of the optical fiber 12 due to a corrosive gas or plasma can be suppressed. As a result, the durability of the temperature measurement wafer 10D is improved.

Meanwhile, in each of the above embodiments, the temperature measurement wafer 10 is an example of a temperature measurement substrate. The wafer 11 is an example of a substrate. The coarse portion 14 is an example of a first pattern portion. The dense portion 15 is an example of a second pattern portion.

In the foregoing, the temperature measurement substrates and the temperature measurement systems have been described in the above embodiments. However, the present disclosure is not limited to the above embodiments, and various modifications and improvements can be made within the scope of the present disclosure.

In each of the above embodiments, a case where one optical fiber 12 is laid on the surface of the wafer 11 has been described as an example. However, a plurality of optical fibers 12 may be laid on the surface of the wafer 11. In this case, the computer 20 and the measuring device main body 30 may be provided to correspond to each of the plurality of optical fibers 12.

In addition, in each of the above embodiments, a case where an optical fiber 12 is laid on one surface of the wafer 11 has been described as an example. However, optical fibers 12 may be laid on both surfaces of the wafer 11.

In addition, the temperature measurement wafer 10 in each of the above embodiments may be used in the state of being placed on a wafer mounting table configured to hold a wafer thereon in order to perform, for example, a predetermined processing or inspection on the wafer. When the temperature measurement wafer 10 is used in the state of being mounted on the wafer mounting table, in the case where an optical fiber 12 is laid on one surface of the wafer 11, the temperature measurement wafer 10 may be mounted, for example, in the state where the one surface of the wafer 11 is placed on the upper side such that the fiber 12 is not in contact with the wafer mounting table. Further, for example, the temperature measurement wafer 10 may be mounted in the state where the one surface of the wafer 11 is placed on the lower side such that the optical fiber 12 is in contact with the wafer mounting table.

The substrate used for the temperature measurement substrate of the present disclosure is not limited to a wafer, and may be a substrate used for a flat panel display or a solar cell, for example.

This application claims the priority of basic application No. 2016-083933 filed with the Japanese Patent Office on Apr. 19, 2016, the entire contents of which are incorporated herein by reference.

| Description of Symbols | |
| --- | --- |
| 10: temperature measurement wafer | 11: wafer |
| 12: optical fiber | 13: connection portion |
| 14: coarse portion | 15: dense portion |
| 16: adhesive member | 17: recess |
| 18: optical fiber laying portion | 20: calculator |
| 30: measurement instrument body | |

What is claimed is:

1. A temperature measurement substrate comprising:
a semiconductor wafer or a substrate for a flat panel display; and
at least one optical fiber laid on a surface of the semiconductor wafer or the substrate for a flat panel display, and having a first pattern portion and a second pattern portion formed more densely than the first pattern portion,
wherein the second pattern portion is formed in a vortex shape having a first turn and a second turn having a bending radius different from a bending radius of the first turn in plan view.

2. The temperature measurement substrate of claim 1, wherein the optical fiber has a start end and a tail end configured to introduce light thereinto.

3. The temperature measurement substrate of claim 1, wherein the first pattern portion and the second pattern portion are alternately arranged.

4. The temperature measurement substrate of claim 1, wherein the second pattern portion has a length equal to or longer than a pulse length of a pulse light incident into the optical fiber.

5. The temperature measurement substrate of claim 1, wherein the second pattern portion has a minimum bending radius equal to or longer than an allowable bending radius of the optical fiber.

6. The temperature measurement substrate of claim 1, wherein the second pattern portion has a minimum bending radius equal to an allowable bending radius of the optical fiber.

7. The temperature measurement substrate of claim 1, wherein the optical fiber has a plurality of second pattern portions, and each of the plurality of second pattern portions have a same shape.

8. The temperature measurement substrate of claim 1, wherein the second pattern portion is disposed on an outer peripheral portion of the semiconductor wafer or the substrate for a flat panel display, and the first pattern portion is disposed closer to a center side of the semiconductor wafer or the substrate for a flat panel display than the second pattern portion.

9. The temperature measurement substrate of claim 1, wherein the second pattern portion has a portion formed in a vortex shape in plan view and a portion disposed closer to an outer peripheral portion than the first pattern portion.

10. The temperature measurement substrate of claim 1, wherein the second pattern portion is fixed to the surface of the semiconductor wafer or the substrate for a flat panel display by an adhesive member.

11. The temperature measurement substrate of claim 10, wherein the second pattern portion is covered with the adhesive member.

12. The temperature measurement substrate of claim 10, wherein the adhesive member is formed of a highly heat-conductive material.

13. A temperature measurement system comprising:
the temperature measurement substrate defined in claim 1; and
a measurement instrument body configured to introduce a pulse light into the optical fiber of the temperature measurement substrate.

14. The temperature measurement substrate of claim 1, wherein the first turn and the second turn of the second pattern portion are spaced apart from each other in a direction perpendicular to a tangent line of the first turn.

15. The temperature measurement substrate of claim 1, wherein an entire portion of the second pattern portion contacts the surface of the semiconductor wafer or the substrate for a flat panel display.

* * * * *